United States Patent Office 3,167,576
Patented Jan. 26, 1965

3,167,576
PROCESS FOR THE PREPARATION OF 3,9-DIHY-
DROXY - 2,4,8,10 - TETRAOXA - 3,9 - DIPHOSPHA-
SPIRO[5.5]UNDECANE-3,9-DIOXIDE
Rudi F. W. Rätz, Hamden, Conn., assignor to Olin
Mathieson Chemical Corporation, New Haven, Conn.,
a corporation of Virginia
No Drawing. Filed Feb. 23, 1962, Ser. No. 175,335
5 Claims. (Cl. 260—461)

This invention relates to the preparation and identification of a novel bifunctional spiro-phosphoric acid and to an unique process for preparing this compound. More specifically this compound may be represented by the following structure:

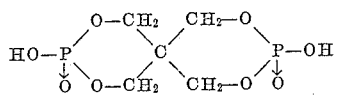

The correct chemical name for the above compound in accordance with Chemical Abstracts usage is 3,9-dihydroxy-2,4,8,10 - tetraoxa-3,9 - diphosphaspiro[5.5]undecane-3,9-dioxide.

In a concurrently filed copending application S.N. 175,270, filed February 23, 1962, an improved process for the preparation of the corresponding 3,9-dichloro derivative has been described. This chlorinated derivative has been used as an intermediate in the experimental work described herein.

The principal object of this invention was to prepare the above illustrated acid.

Another object of this invention was to devise a process wherein the above novel spiro-phosphoric acid might be prepared in high yield from the corresponding 3,9-dichloro derivative. Other objects will be indicated in the following discussion or will be apparent therefrom.

These objects have been accomplished in accordance with this invention. The desired spiro-phosphoric acid has been isolated and characterized as a solid non-hygroscopic acid which can be readily stored for extended periods without deterioration. The novel spiro-phosphoric acid has two terminal P—OH groups of equal acidic strength. Furthermore, it has been prepared in excellent purity as indicated by elemental analysis and by titration with standard bases. Such an acid is ideally suitable for use as an intermediate in the synthesis of novel bifunctional derivatives containing the spiro grouping. A novel and efficient process has also been found by which the acid can be readily prepared in high yield from the corresponding 3,9-dichloro derivative.

It has been found that the desired acid can be readily obtained by the reaction of the 3,9-dichloro derivative with an aliphatic alcohol. Although the reaction can be carried out in the absence of a solvent, it has been found that the reaction proceeds extremely well when dimethylformamide is utilized as a solvent. The preferred process embodiment utilizes such solvent. In the absence of such solvent, the yield of the desired diacid is much lower and product isolation is more difficult.

Aliphatic alcohols in general can be utilized in the reaction but it is preferred to utilize aliphatic diols. Examples of such diols are 1,4-butanediol, 1,4-dihydroxymethyl cyclohexane, ethylene glycol, 1,6-hexanediol and 1,3-propanediol although other diols can be advantageously used.

Therefore in the preferred process the 3,9-dichloro derivative is dissolved in dimethylformamide, and the selected diol is added to the solution. As reaction occurs upon heating, a crystalline material separates out of the reaction solution, and this is the mono-dimethylammonium salt of the desired acid. This salt can be easily filtered and upon acidification, the spiro-acid is readily obtained.

A fuller understanding of the experimental procedures involved in the preparation of the novel acid can be obtained by referring to the following examples, but it should be understood that the invention is not limited to the matter specifically contained in these examples.

Example 1

Into a reaction flask was placed 19.0 grams (0.064 mole) of 3,9-dichloro-2,4,8,10 - tetraoxa-3,9-diphosphaspiro[5.5]undecane-3,9-dioxide dissolved in 150 ml. of double distilled anhydrous dimethylformamide. Then 5.75 g. (0.064 mole) of 1,4-butanediol was added in one portion to the reaction flask. The mixture was heated and maintained at reflux temperature for 30 minutes. After this period, the separation of a colorless crystalline solid was observed. Refluxing was continued for another 10 minutes, and then the reaction mixture was allowed to cool to room temperature before it was filtered. A solid product (17.5 g.) was obtained after filtration. An additional crop of 1.5 g. separated from the filtrate upon standing for several days. Thus a total solid content of 19.0 g. was obtained from the reaction which after recrystallization from 1,4-butanediol melted at 266° C. Analysis revealed that this product was 3,9-dihydroxy-2,4,8,10-tetraoxa-3,9 - diphosphaspiro[5.5]undecane-3,9 - dioxide-mono-dimethylammonium salt, and a yield of 97.4% of this product was obtained.

Analysis.—Calc'd for $C_7H_{19}NO_8P_2$: C, 27.55; H, 5.58; N, 4.59; P, 20.35. Found: C, 27.58, 28.18; H, 5.71, 5.85; N, 4.50, 4.70; P, 20.10.

Example 2

Into a reaction flask was placed 5.94 g. (0.02 mole) of 3,9-dichloro-2,4,8,10-tetraoxa - 3,9 - diphosphaspiro[5.5] undecane-3,9-dioxide dissolved in 150 ml. of double distilled anhydrous dimethylformamide. Then 2.88 grams (0.02 mole) of 1,4-dihydroxymethyl cyclohexane was added to the solution with shaking until a clear and colorless mixture resulted. After 15 minutes of refluxing, a crystalline white substance separated from the reaction medium. This solid was filtered and washed twice with acetone. Again the product was identified as 3,9-dihydroxy-2,4,8,10-tetraoxa-3,9-diphosphaspiro[5.5]undecane-3,9 - dioxide - mono - dimethylammonium salt, melting at 264–6° C. and was obtained in 98.4% yield. No melting point depression was observed when this product was melted with the product obtained in Example 1.

The dimethylformamide in the filtrate was removed by distillation at 5 mm. raising the oil bath temperature finally to 130° C. A two-layer residue remained, the upper layer being a yellowish oil with a characteristic odor, and the lower dark-brown layer solidified on standing. The solid apparently was a mixture of dimethylamine hydrochloride and some of the mono-dimethylammonium salt. The yellow oil was found to be no chemical entity but was probably about a one to one mixture of the compounds having the following structures:

and

Analysis.—Calc'd for a 1:1 mixture of $C_8H_{14}Cl_2$ and $C_8H_{13}Cl$: C, 59.7; H, 8.37; Cl, 31.90. Found: C, 59.4; H, 8.56; Cl, 33.03.

The infrared spectrum for this yellow oil did not show any OH absorption but indicated unsaturation, and a carbon tetrachloride solution of this oil decolorized bromine instantly.

*Example 3*

The amount of 2.2 grams of mono-dimethylammonium salt as prepared in Example 1 was dissolved in 25 ml. of distilled water, and the solution was poured into a column containing Dowex-50-W-X-8,[1] an ion-exchange resin in the acid form having a capacity of 1.7 meg./ml. wet resin. The solution obtained was evaporated at room temperature resulting in 1.9 g. of a solid material with melting point of 287° C. A second run through the same column gave the same amount of solid but with an increased melting point (304° C.) This solid was recrystallized once from glacial acetic acid yielding bipyrimidal crystals having a melting point of 314° C.

The following analysis indicated that the desired spirophosphoric acid was obtained in 98.8% yield based on salt used in the reaction.

*Analysis.*—Calc'd for $C_5H_{10}O_8P_2$: C, 23.20; H, 3.85; P, 23.82. Found: C, 23.24, 23.00; H, 3.74, 3.60; P, 23.21.

Titration of 57.61 mg. of the above crystalline acid with 0.0947 N sodium hydroxide solution required 4.65 ml. to reach the end point. A calculated equivalent weight of 130.8 was obtained as a result of this titration which compares with the theoretical value of 130.

*Example 4*

The amount of 2.0 g. of crude mono-dimethylammonium salt as prepared in Example 1 was mixed with 10 ml. of 40% hydrochloric acid with external cooling. The prepared solution was then evaporated in vacuo at room temperature until dryness was obtained. From the resulting mixture of crystals, dimethylammonium chloride (M.P. 168-70° C.) was extracted by hot chloroform. The insoluble residue 1.6 g. was the desired spiro-phosphoric acid and was obtained in 94% yield. After one recrystallization from glacial acetic acid, crystals were obtained which melted at 308° C.

*Example 5*

Conductimetric titration of 261.96 mg. of the spiro-phosphoric acid with 0.106 N aqueous dimethylamine required 18.9 ml. to reach the end point. (This gives a calculated equivalent weight for the acid of 131 as compared with the theoretical value of 130.)

The titrated aqueous solution was evaporated to dryness and the solid residual product was dissolved in ethanol and filtered. Solid material was precipitated upon the addition of acetone, and after it was filtered and dried, colorless crystals were isolated which melted at 214-16° C. This product was identified as the bis-dimethylammonium salt represented by the following structure and had been obtained in nearly quantitative yield.

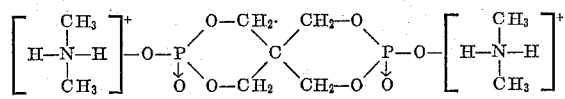

*Example 6*

The amount of 17.82 g. (0.06 mole) of 3,9-dichloro-2,4,8,10 - tetraoxa - 3,9 - diphosphaspiro[5.5]undecane-3,9-dioxide was placed in a 100 ml. round bottom flask and mixed thoroughly with 5.4 g. (0.06 mole) of 1,4-butanediol. The joint of the flask was connected via an adapter to a 50 ml. receiver flask. A capillary was led through the opening of the adapter head allowing the flow of a dry nitrogen stream. The system was purged with nitrogen and then the reaction mixture was heated to 110° C. whereupon reaction occurred accompanied by hydrogen chloride elimination. By immersing the receiver flask in ice water, 2 g. of a colorless mobile liquid ($n_D^{25}$—1.4140) was condensed. This material was identified as a mixture of tetrahydrofuran and water by vapor-phase chromatography. After keeping the reaction mixture for one hour at 110° C., the temperature was raised and kept at 145° C. for 3 hours. Application of a 14 mm. vacuum at 145° C. caused fast distillation of an almost colorless oil (1 g.) and formation of a residual gray powdery material (16.5 g.). The oily distillate was subjected to vapor-phase chromatography and infrared analysis and found to be a mixture of 85% 1,4-butanediol and 15% 4-chloro-1-butanol. The solid residue was extracted with hot ethanol resulting in 9.0 g. of a colorless solid mixture of 4.5 g. unreacted 3,9 - dichloro - 2,4,8,10 - tetraoxa - 3,9 - diphosphaspiro [5.5]undecane-3,9-dioxide and 4.5 g. of the desired spirophosphoric acid. An additional crop of 3.8 g. of the acid was obtained after ethanol removal from the ethanol extract and treatment of the residue with 30 ml. of acetone which dissolved a hygroscopic brown glassy material. The combined fractions of the spiro-phosphoric acid amounted to 8.3 g. (53.2% yield, 71% conversion). After recrystallization from glacial acetic acid, pyrimidal crystals having a melting point of 306-7° C. were obtained. A mixed melting point performed with pure product resulted in no melting point depression.

In the preferred process embodiment substantially equivalent amounts of the aliphatic alcohol and the 3,9-dichloro derivative should be employed. Although reaction temperatures of from 80-160° C. can be utilized, reaction is sluggish at the lower range, and the preferred reaction temperature is about 130-160° C.

The first two examples described above illustrate the reaction of the 3,9-dichloro derivative with aliphatic diols in a dimethylformamide solvent. In each example, the mono-dimethylammonium salt of the spiro-phosphoric acid was obtained in over 97% yield, and this crystalline material was isolated in high purity. It is noted that a by-product was obtained in Example 2 which was identified as a mixture of chlorinated derivatives corresponding to the aliphatic diol employed.

In Example 3 the spiro-phosphoric acid was obtained in nearly quantitative yield by passing the mono-dimethylammonium salt through a column containing an ion exchange resin. Elemental analysis as well as titration information indicated that the pure acid had indeed been isolated. In Example 4, the acid was also obtained by acidifying the mono-dimethylammonium salt with hydrochloric acid.

Example 5 describes the preparation of the novel bis-dimethylammonium salt by reaction of the spiro-phosphoric acid with dimethylamine. A nearly quantitative yield of the pure salt was obtained therein. Similar salts can also be formed with other amines. The ammonium salt of the acid is easily prepared and is an effective flameproofing agent in cotton fibers and in cellulosic fabrics and films.

Also the mono-dimethylammonium salt can be reacted with quaternary ammonium halides to obtain a novel series of quaternary ammonium phosphates in which the anion consists of the acid component. These compounds possess characteristics which have been found to be desirable in bactericidal applications.

Example 6 shows that the desired acid can be prepared by the reaction of the 3,9-dichloro derivative with an alcohol in the absence of the dimethylformamide solvent. However the entire process is much more involved and tedious, and the final yield of the spiro-acid obtained was much lower than when the solvent was utilized.

It should be noted that a small amount of tetrahydrofuran was isolated and identified as a by-product in Example 6. On further study, it was established that the spiro-phosphoric acid had catalyzed the formation of this product from the 1,4-butanediol. The novel acid accordingly may generally be utilized as a catalyst in such dehydration reactions.

---

[1] This is a trademark name for a synthetic ion-exchange resin obtained from the Dow Chemical Company.

A unique and efficient process had therefore been invented for the preparation of the novel spiro-phosphoric acid. This dibasic acid can be utilized in many applications where a solid, non-hygroscopic strong acid is required. For example it can be advantageously used in many reactions to replace the hygroscopic p-toluenesulfonic acid. It can be employed as a catalyst specifically in reactions such as the aforementioned etherification. As noted in the above discussion, it is also a valuable intermediate in the preparation of other novel bifunctional derivatives containing the same spiro structure.

What is claimed is:

1. In the preparation of 3,9-dihydroxy-2,4,8,10-tetraoxa - 3,9 - diphosphaspiro[5.5]undecane - 3,9 - dioxide, the process which comprises dissolving 3,9-dichloro-2,4,8,10 - tetraoxa - 3,9 - diphosphaspiro[5.5]undecane-3,9-dioxide in dimethylformamide, reacting said dichloride with a substantially equivalent amount of an unsubstituted aliphatic alcohol at a reaction temperature of about 80–160° C., filtering the resulting 3,9-dihydroxy-2,4,8,10 - tetraoxa - 3,9 - diphosphaspiro[5.5]undecane-3,9-dioxide-mono-dimethylammonium salt from the reaction mixture, acidifying said salt and isolating the resulting di-acid.

2. The process of claim 1 wherein the preferred reaction temperature is 130–160° C.

3. The process of claim 1 wherein diols are utilized as the aliphatic alcohols in the reaction.

4. A process for preparing a bifunctional spiro-phosphoric acid which comprises reacting 3,9-dichloro-2,4,8,10 - tetraoxa - 3,9 - diphosphaspiro[5.5]undecane - 3,9-dioxide with a substantially equivalent amount of an unsubstituted aliphatic alcohol at a reaction temperature of about 80–160° C.

5. A process for preparing a bifunctional spiro-phosphoric acid which comprises reacting 3,9-dichloro-2,4,8,10 - tetraoxa - 3,9 - diphosphaspiro[5.5]undecane - 3,9-dioxide with a substantially equivalent amount of an unsubstituted aliphatic diol at a reaction temperature of about 80–160° C., and isolating the spiro-phosphoric acid.

References Cited by the Examiner

UNITED STATES PATENTS

| | | | |
|---|---|---|---|
| 2,426,691 | 9/47 | Jenkins | 260—461.305 |
| 2,470,042 | 5/49 | McLean et al. | 260—461.303 |
| 2,485,573 | 10/49 | Craig et al. | 260—461.310 |
| 2,583,549 | 1/52 | Daul et al. | 260—461.303 |
| 2,795,609 | 6/57 | Jensen et al. | 260—461.310 |
| 3,090,799 | 5/63 | Wahl et al. | 260—461.303 |

OTHER REFERENCES

Charonnat et al.: "Chem. Abst.," volume 47, column 6606 (1953).

Patai et al.: "J. Org. Chem.," July 1960, vol. 25, No. 7, pages 1232–1234.

CHARLES B. PARKER, Primary Examiner.

M. LIEBMAN, IRVING MARCUS, Examiners.